Patented July 7, 1931

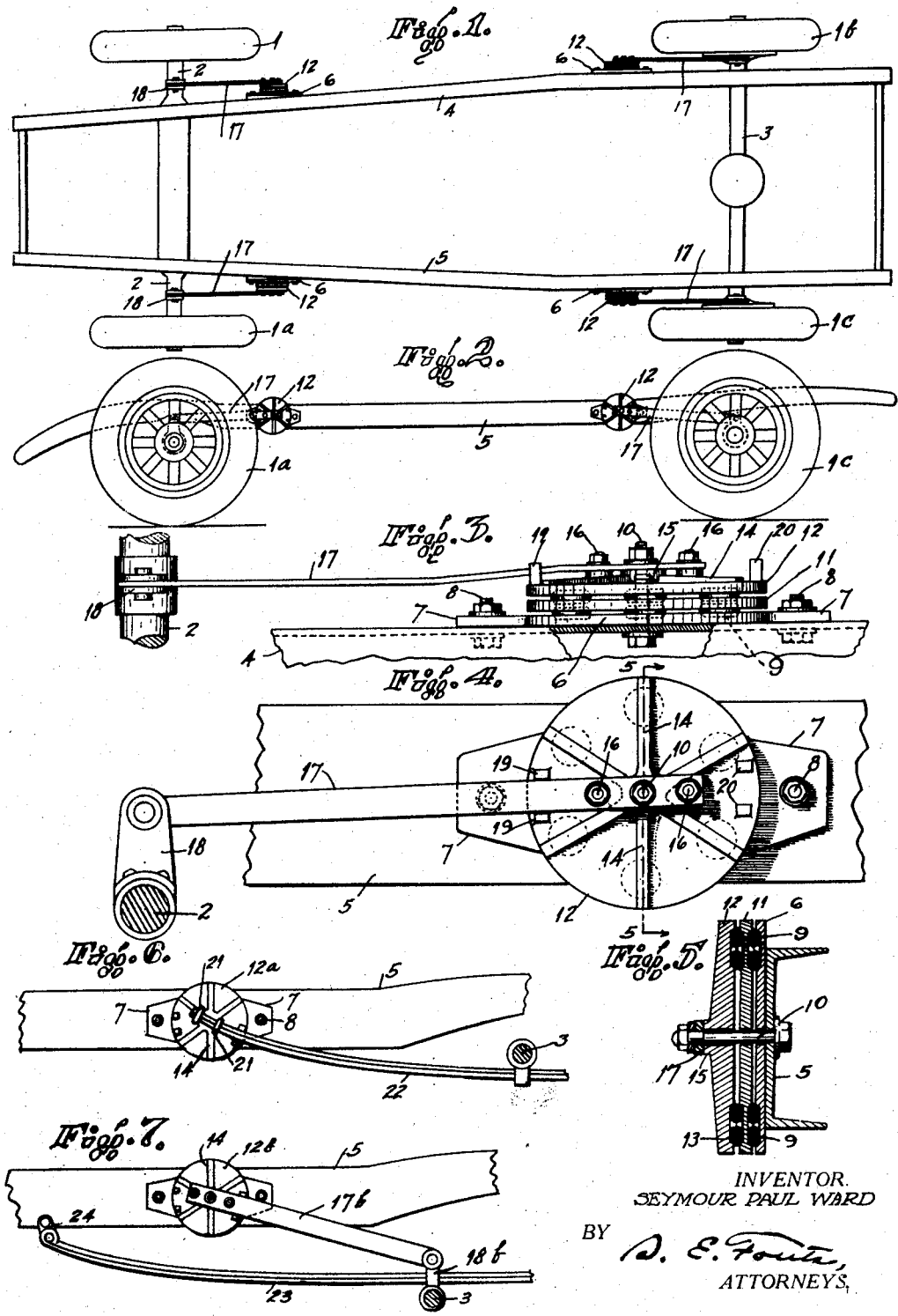

1,813,214

UNITED STATES PATENT OFFICE

SEYMOUR PAUL WARD, OF OAKLAND, CALIFORNIA, ASSIGNOR TO CALREW INCORPORATED, OF SAN FRANCISCO, CALIFORNIA, A CORPORATION OF NEVADA

RESILIENT CONNECTION

Application filed April 9, 1928. Serial No. 268,545.

This invention relates to resilient connections between two relatively movable parts or mechanisms, such, for example, as the axles and chassis frames of automotive vehicles. When used in the relation just stated, the invention supplants or supplements the springs generally employed to furnish the resiliency required.

In my invention, the resiliency is obtained by the use of rubber, or a composition containing rubber, the same being in the form of circular pads or disks which are housed in pockets or recesses in the opposed faces of parts which are relatively movable. When my invention is applied to a vehicle, these relatively movable parts are so connected with the chassis frame and the axle respectively that the frame and its load are yieldingly supported by the disks or pads and the relative movements of the parts puts the pads under a shearing stress.

As is well understood, a steel vehicle spring responds very quickly to stresses, and it also recovers very quickly, with the result that there is often a serious rebound which is liable to break the spring. If the spring does not break, the rebound tends to lift the axle, with the result that the wheels bear lightly upon the road or may be completely lifted from it. As a consequence, the vehicle does not hold the road satisfactorily. In an attempt to overcome these difficulties, various forms of shock-absorbers have been employed.

As is also well known, rubber does not respond so quickly to stresses as does steel, nor does it recover so quickly after it has been distorted. When, therefore, it is employed as the resilient agent between a vehicle chassis frame and the axle, the frame does not drop either so quickly or so far, nor does it recover so quickly as to cause a serious rebound. Consequently, the wheels hold the road and the vehicle does not skid. The use of shock-absorbers is unnecessary.

It is, therefore, the purpose of my invention to make available the above stated characteristic of rubber as the resilient element in the connecting means between movable parts, and particularly between the chassis frame and axle of an automotive vehicle, and so to embody the rubber in the connecting means as to secure such advantage in the fullest measure. While the following specification and the accompanying drawings disclose what is, at present, the preferred embodiment of my invention, I realize that the principle of the invention may be employed in various forms, and I wish it understood that the claims herein made are not intended to be limited to the structure specifically described any farther than the language therein employed render such limitation necessary.

Referring to the accompanying drawings, Fig. 1 is a plan and Fig. 2 a side elevation showing a conventional form of the chassis frame of an automotive vehicle having my invention applied thereto; Fig. 3 is a plan view on a larger scale of my invention as applied at the right-hand front wheel, showing a specific means of attaching the same to the vehicle; Fig. 4 is a side elevation of the invention as it is applied at the left-hand front wheel; Fig. 5 is a sectional view taken through the structure on the line 5—5 of Fig. 4; Fig. 6 shows a modification in which the connection with the axle is a steel spring, and Fig. 7 shows another modification in which the invention serves not merely as a part of the resilient connection between the chassis frame and the axle but as a shock-absorber to prevent excessive rebound.

The drawings disclose the invention applied to an automotive vehicle having two front wheels 1 and 1$^a$, and two rear wheels 1$^b$ and 1$^c$, connected in the usual manner to the front axle 2, and the rear axle 3, respectively. The side members or sills of the chassis frame are indicated at 4 and 5. In a four-wheeled vehicle, as shown, my invention is used adjacent each wheel as a resilient connection between the frame and the corresponding axle. While, therefore, Fig. 1 shows four devices embodying my invention, it will be understood that these devices, per se, are substantially alike, although their positions with respect to the opposite sides of the chassis frame and to the axles necessitate slight differences in their connections with the latter, it being understood that the devices are all preferably located between the axles so that some of the said connections project forwardly while the others project rearwardly.

Looking first at Fig. 3, which shows in plan the invention applied adjacent wheel 1, 6 is a flat metallic plate which is preferably circular, except for diametrically arranged ears 7, by means of which ears the plate is secured to the frame member 4, as by means of bolts 8. This plate is provided in its outer face with a series of circular pockets or recesses for partially housing certain of the resilient elements, as shown at 9. These elements are preferably circular pads or disks of rubber or the like, and they are so mounted as to be subjected to shearing stresses. To permit the rubber to flow, the pads are formed with suitable cavities, Fig. 5 showing them with a centrally arranged hole extending therethrough. It will be understood, however, that various forms and arrangements of cavities in the pads may be employed, it being necessary only that some space be provided into which the rubber may flow. As indicated in Fig. 4, the pads are preferably disposed in a circular row which is concentric with the plate 6, and they are located as near the perimeter of the plate as is practicable.

Extending outwardly from the adjacent frame member 4 or 5 and through a hole in the center of the plate 6 is a bolt 10; and, mounted upon said bolt coaxially with the plate 6 are two other plates 11 and 12, which are preferably circular in form. These two plates are capable of an oscillatory movement upon the bolt. The central plate 11 is provided with pockets or recesses in both of its sides, the pockets corresponding in size, number and arrangement with the pockets in the plate 6.

The outer plate 12 likewise has a series of pockets in its side which faces the plate 11. These pockets in the plate 12 and those in the plate 11 which are paired with them constitute housings for the elastic pads 13, while the pockets in that side of plate 11 which faces the plate 6 form, with the pockets in the latter plate, housings for the elastic pads 9. With this arrangement of parts, it is evident that when the plate 12 is rocked in either direction from its normal position the pads 9 and 13 are put under shearing stress and that the pads resist those movements. To reinforce the outer plate and prevent it from buckling, it is provided with a series of radiating ribs 14 which connect at their inner ends with a hub boss 15. While, for clearness of illustration, I have shown the plates 6, 11 and 12 spaced apart a substantial distance, in practice the plates are brought as closely together as is practicable without having them in actual contact.

Secured to the outer face of plate 12 by the bolt 10 and also by a pair of other bolts 16, is a relatively long arm 17. The bolts 16 hold the arm against oscillation upon the center bolt 10 except as the plate 12 oscillates therewith. The arm is extended over the axle 2 or 3, as the case may be, and is attached at its end to a shackle 18 which is mounted to rock about the axle. To strengthen the engagement of the arm 17 with the plate 12, the latter is preferably provided with two pairs of outwardly projecting lugs, the pairs being shown at 19 and 20 respectively. These pairs are almost diametrically arranged on the plate and the lugs of each pair are spaced to receive the arm 17 between them. By having the two pairs, the arm may be projected from the center bolt 10 either forwardly or backwardly. The plate 6 is symmetrical in its contour so as to be capable of use on either side of the chassis frame.

In that form of my invention which is illustrated in Fig. 6, the outer plate 12$^a$ is similar to the plate 12 but differs from it in that it is provided with suitable members 21 for clamping and holding the end of a steel leaf spring 22, which spring is suitably attached to the adjacent axle. The resiliency in this form is furnished both by the leaf spring and by the elastic pads, it being understood that the structure behind the plate 12$^a$ is the same as that shown in Figs. 3, 4 and 5. The leaf spring and the elastic pads supplement each other and a very sensitive mounting of the chassis frame is thus secured.

In the form shown in Fig. 7, the plate 12$^b$ is substantially the same as the plate 12, means being provided for securing thereto an arm 17$^b$, which corresponds in structure and function to the arm 17, said arm 17$^b$ being pivoted to a shackle 18$^b$ which is connected with the adjacent axle structure. Resiliency is thus secured through the rubber pads which are arranged back of the plate 12$^b$, as in Figs. 3, 4 and 5, and through the leaf spring 23 which is suitably attached to the adjacent axle and to a shackle 24 on the chassis frame. By this arrangement, the elastic pads with their associated plates, arm 17$^b$ and shackle 18$^b$ serve not only to assist the leaf spring in resisting the downward movements of the chassis frame, but to prevent rebound, thereby functioning as a shock absorber.

In the use of my invention as a resilient connection between the chassis frame and axle of an automotive vehicle, I prefer to attach the pad-carrying plates to the frame and to connect the same to the axles through the arms and shackles, as shown. But it is obvious that a reversed arrangement may be practically employed wherein the pad-carrying plates are stationarily secured about the axle, as to the usual axle housing, while the arm is connected to the chassis frame through a shackle. It is understood, therefore, that, unless specifically limited, the following claims are intended to include such a reversed arrangement. The double series of pads and the central plate 11 are employed to permit relatively extensive movements between the frame and axle without damage to the pads. Where these movements are more restricted, the central plate 11 may be omitted and but a single series of pads may be employed, the same being housed in the pockets of the plates 6 and 12, as will be understood. Further, if still greater movement between the frame and axle be desired, an additional plate or plates 11 may be employed with a corresponding additional series of elastic pads.

Having thus described my invention, what I claim as new and desire to secure by Letters Patent is:—

1. A resilient connection between two relatively movable members attached to the frame and axle respectively of an automotive vehicle, said connection comprising a pair of coaxially arranged metallic disks facing each other and being provided with a series of opposed shallow, circular pockets forming housings, means connecting said disks with the respective movable members which are attached to the frame and axle such that a relative movement of said members produces a pivotal movement between the said disks, and a series of flat, circular pads of rubber-like material snugly fitted within the opposed pockets in said disks and adapted to be placed under a shearing stress due to the pivotal movement between the disks.

2. A structure such as set forth in claim 1 in which the opposed pockets in the disks are shallow circular depressions and in which the elastic elements are flat, circular pads of rubber-like material substantially filling the pockets, each of said pads being provided with a recess to form a space into which the material may flow when the pads are subjected to stress.

3. In a resilient connection between two relatively movable parts, the combination of two outer and an inner plate, said plates being disposed side by side, connections between the said two outer plates and the respective movable parts each of said outer plates having a pocket therein facing the inner plate and in the inner plate having a pocket on each of its sides opposing the pocket in the adjacent outer plate, the opposing pockets forming housings, and elastic elements housed in said opposing pockets and adapted to be placed under stress when the plates are moved relatively to one another through the connections of the outer plates with the said movable parts.

4. A structure such as set forth in claim 3 in which the outer and the inner plates are disks coaxially disposed and in which the resilient elements are circular and flat pads of rubber-like material.

5. In a resilient connection between the frame and axle of an automotive vehicle, the combination of two outer and an inner disk coaxially disposed side by side, connections between the said outer disks and the frame and axle respectively, each of said outer disks having a series of pockets therein facing the inner disks and the inner disk having a series of pockets in each of its sides arranged in opposing relation to the pockets in the outer disks and forming therewith a double series of housings, and elastic pads fitted within said housings.

6. In a resilient connection between the frame and the axle of an automotive vehicle, the combination of a metallic disk rigidly secured to the said frame, a second disk, an arm projecting from the second disk, means connecting said arm with the said axle, an inner disk disposed between the two other disks, said three disks being coaxially mounted side by side, the inner disk having a series of pockets in each of its sides and each of the outer disks having a series of pockets on its inner side corresponding but opposed to the pockets in the inner disk and forming therewith a double series of housings, and resilient elements within said housings and adapted to be placed under shearing stress due to the relative movement between the vehicle frame and axle.

7. A structure such as set forth in claim 6 in which the resilient elements are flat, circular pads of elastic material.

In testimony whereof I have signed my name to this specification.

SEYMOUR PAUL WARD.